United States Patent
Hill et al.

(10) Patent No.: US 11,818,141 B2
(45) Date of Patent: Nov. 14, 2023

(54) PATH VALIDATION CHECKS FOR PROOF OF SECURITY

(71) Applicant: Cisco Technology, Inc., San Jose, CA (US)

(72) Inventors: Craig Thomas Hill, Sterling, VA (US); Sujal Sheth, Ahmedabad (IN); Frank Brockners, Cologne (DE); Cesar Obediente, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 153 days.

(21) Appl. No.: 17/546,492

(22) Filed: Dec. 9, 2021

(65) Prior Publication Data

US 2023/0188534 A1 Jun. 15, 2023

(51) Int. Cl.
*H04L 29/06* (2006.01)
*H04L 9/40* (2022.01)
*H04L 9/08* (2006.01)

(52) U.S. Cl.
CPC .......... *H04L 63/123* (2013.01); *H04L 9/0838* (2013.01); *H04L 63/0464* (2013.01); *H04L 63/20* (2013.01); *H04L 63/205* (2013.01)

(58) Field of Classification Search
None
See application file for complete search history.

(56) References Cited

U.S. PATENT DOCUMENTS

| | | | |
|---|---|---|---|
| 2006/0129691 A1* | 6/2006 | Coffee | H04L 67/04 709/230 |
| 2007/0005801 A1* | 1/2007 | Kumar | H04L 63/08 709/238 |
| 2007/0199049 A1* | 8/2007 | Ziebell | H04L 63/10 726/3 |
| 2007/0245140 A1 | 10/2007 | Sakaguchi | |

(Continued)

OTHER PUBLICATIONS

Goncalves, Fabio et al. Intelligent Hierarchical Intrusion Detection System for VANETs. 2021 13th International Congress on Ultra Modern Telecommunications and Control Systems and Workshops (ICUMT). https://ieeexplore.ieee.org/stamp/stamp.jsp?tp=&arnumber=9631589 (Year: 2021).*

(Continued)

*Primary Examiner* — Jeremiah L Avery
(74) *Attorney, Agent, or Firm* — Baker Botts L.L.P.

(57) ABSTRACT

According to an embodiment, a node comprises one or more processors and one or more computer-readable non-transitory storage media comprising instructions that, when executed by the one or more processors, cause one or more components of the node to perform operations. The operations comprise determining security validation information that the node associates with a packet, inserting into the packet an identifier associated with the node and the security validation information that the node associates with the packet, and transmitting the packet comprising the identifier associated with the node and the security validation information that the node associates with the packet. The security validation information comprises one or more proof of security attributes and/or one or more proof of security level attributes.

20 Claims, 2 Drawing Sheets

(56) References Cited

U.S. PATENT DOCUMENTS

| | | | |
|---|---|---|---|
| 2011/0083009 A1* | 4/2011 | Shamoon | H04N 21/23476 |
| | | | 713/150 |
| 2015/0092564 A1 | 4/2015 | Aldrin | |
| 2016/0219024 A1* | 7/2016 | Verzun | H04L 9/0662 |
| 2017/0346851 A1* | 11/2017 | Drake | H04L 9/0838 |
| 2018/0227168 A1 | 8/2018 | Ward et al. | |
| 2019/0158279 A1 | 5/2019 | Chimakurthy et al. | |
| 2020/0322353 A1 | 10/2020 | Bhandari et al. | |
| 2023/0209345 A1* | 6/2023 | Moon | H04W 12/121 |
| | | | 726/4 |

OTHER PUBLICATIONS

Abumansoor, Osama; Boukerche, Azzedine. Towards a Secure Trust Model for Vehicular Ad Hoc Networks Services. 2011 IEEE Global Telecommunications Conference—GLOBECOM 2011. https://ieeexplore.ieee.org/stamp/stamp.jsp?tp=&arnumber=6134243 (Year: 2011).*

Usman, Muhammad; Hassan, Shoaib. Analysing Different Threats Levels in NGN and Ensuring Its Security with Quality of Services 2014 International Conference on IT Convergence and Security (ICITCS). https://ieeexplore.ieee.org/stamp/stamp.jsp?tp=& arnumber=7021736 (Year: 2014).*

Yang, Ho-Kyung et al. Secure Identifier Management Based on Blockchain Technology in NDN Environment. IEEE Access, vol. 7. https://ieeexplore.ieee.org/stamp/stamp.jsp?tp=&arnumber=8558484 (Year: 2018).*

Network Working Group, Internet—Draft, Intended status: Informational, Expires: Sep. 14, 2017, Requirements for In-situ OAM draft-brockners-inband-oam-requirements-03, 24 pages.

Ippm, Internet—Draft, Intended status: Standards Track, Expires: May 26, 2021, Data Fields for In-situ OAM draft-ietf-ippm-ioam-data-11, 45 pages.

Ippm, Internet—Draft, Intended status: Standards Track, Expires: Sep. 8, 2019, Postcard-based In-band Flow Data Telemetry draft-song-ippm-postcard-based-telemetry-02, 17 pages.

Ippm, Internet—Draft, Intended status: Informational, Expires: Aug. 25, 2021, Integrity of In-situ OAM Data Fields draft-brockners-ippm-ioam-data-integrity-01, 18 pages.

* cited by examiner

PATH VALIDATION CHECKS FOR PROOF OF SECURITY

TECHNICAL FIELD

Certain embodiments relate, in general, to network security and, more specifically, to path validation checks for proof of security.

BACKGROUND

A computing network may comprise a plurality of nodes. Each node may be capable of receiving and/or transmitting data. Examples of nodes may include a source node, a destination node, and one or more intermediate nodes positioned between the source node and the destination node. Security protocols may be used to secure data communicated among the nodes, for example, by providing data confidentiality (such as data encryption), data integrity, data origin authentication, peer authentication, and/or other security. Examples of security protocols include Medium Access Control Security (MACsec), Internet Protocol Security (IPsec), and Secure Sockets Layer (SSL), which may be used to provide security at Layer 2 (data link layer), Layer 3 (network layer), and Layer 6 (presentation layer) of the Open Systems Interconnection (OSI) model, respectively.

DESCRIPTION OF EXAMPLE EMBODIMENTS

Overview

According to an embodiment, a node comprises one or more processors and one or more computer-readable non-transitory storage media comprising instructions that, when executed by the one or more processors, cause one or more components of the node to perform operations. The operations comprise determining security validation information that the node associates with a packet, inserting into the packet an identifier associated with the node and the security validation information that the node associates with the packet, and transmitting the packet comprising the identifier associated with the node and the security validation information that the node associates with the packet. The security validation information comprises one or more proof of security attributes and/or one or more proof of security level attributes.

According to another embodiment, a method performed by a node comprises determining security validation information that the node associates with a packet, inserting into the packet an identifier associated with the node and the security validation information that the node associates with the packet, and transmitting the packet comprising the identifier associated with the node and the security validation information that the node associates with the packet. The security validation information comprises one or more proof of security attributes and/or one or more proof of security level attributes.

According to yet another embodiment, one or more computer-readable non-transitory storage media may embody instructions that, when executed by a processor of a node, cause the performance of operations. The operations comprise determining security validation information that the node associates with a packet, inserting into the packet an identifier associated with the node and the security validation information that the node associates with the packet, and transmitting the packet comprising the identifier associated with the node and the security validation information that the node associates with the packet. The security validation information comprises one or more proof of security attributes and/or one or more proof of security level attributes.

Technical advantages of certain embodiments of this disclosure may include one or more of the following. Certain embodiments facilitate path validation checks for proof of security. For example, certain embodiments ensure that encryption components of an interface are truly encrypted with the proper attributes and security levels desired by an operator. Certain embodiments facilitate path validation checks by leveraging in-situ Operation and Maintenance (iOAM) (sometimes referred to as in-band OAM) and enhancing the capabilities for in-depth security attribute validation. The security attribute validation may be used to assure that security attributes of an interface of a node (such as a router) are in operation, valid, and configured to the levels defined by the operator. The path validation checks may be performed per-hop, end-to-end, or both.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Network operation and maintenance can be enhanced by using capabilities found in iOAM. For example, certain attributes may be defined in iOAM, and information associated with the attributes may be collected per-hop as a packet traverses a path through the network. For example, the information associated with the attributes may be collected within a header of the packet. First information may be added to the header for a first hop, second information may be added to the header for a second hop, and so on. Collecting the information as the packet traverses the path through the network allows for end-to-end verification of the attributes. Network operators may use the collected information for any suitable purpose, such as monitoring the network operation or trouble-shooting problems.

Existing iOAM attributes lack certain security-related information. For example, existing iOAM attributes lack encryption inspection capability. To address this, embodiments of the present disclosure allow for checking security-related information, such as checking an encrypted path and/or an encrypted hop to ensure the encryption components are truly encrypted with the proper attributes and security levels desired by an operator. Certain embodiments leverage iOAM, either per-hop or end-to-end, and enhance the capabilities for in-depth security attribute validation in order to provide assurance that security attributes of a node interface (e.g., a router interface) are in operation, valid, and configured to the levels defined by the operator.

The present disclosure recognizes that although an interface may indicate that encryption is enabled for interesting traffic defined for encryption, a need exists to apply a security validation on interfaces of the secured path traversed by encrypted packets. Security validation can include basic proof checks (e.g., proof of security), in-depth validation checks (e.g., proof of security level), or both. As an example, a basic proof check may check whether a packet that is supposed to be encrypted is actually encrypted, and an in-depth validation check may check encryption algorithms, key ciphers, key-length, etc.

Certain embodiments embed the security validation capability in iOAM. This allows the iOAM checks to leverage the secure topology while executing the per interface checks (such as encryption validation checks) through the selected path deemed as optimal (Flex-algo, preferred links, etc.) while also collecting per-hop counters and relevant telemetry relevant to the security validation. While certain embodiments are described within the context of iOAM, the principles disclosed herein may be applied to other protocols.

Embodiments of the present disclosure provide advantages compared to methods that merely configure security monitoring activity on network elements for auditing purposes. For example, embodiments of the present disclosure allow for performing security validation (e.g., proof of security and/or proof of security level) from an end-to-end path perspective. Certain embodiments comprise per-hop validation checks and statistics collection for security validation of the end-to-end path and all encryption interfaces the path traverses.

Embodiments of the present disclosure are further described with reference to FIGS. 1-3 of the drawings, like numerals being used for like and corresponding parts of the various drawings.

Figure 1:
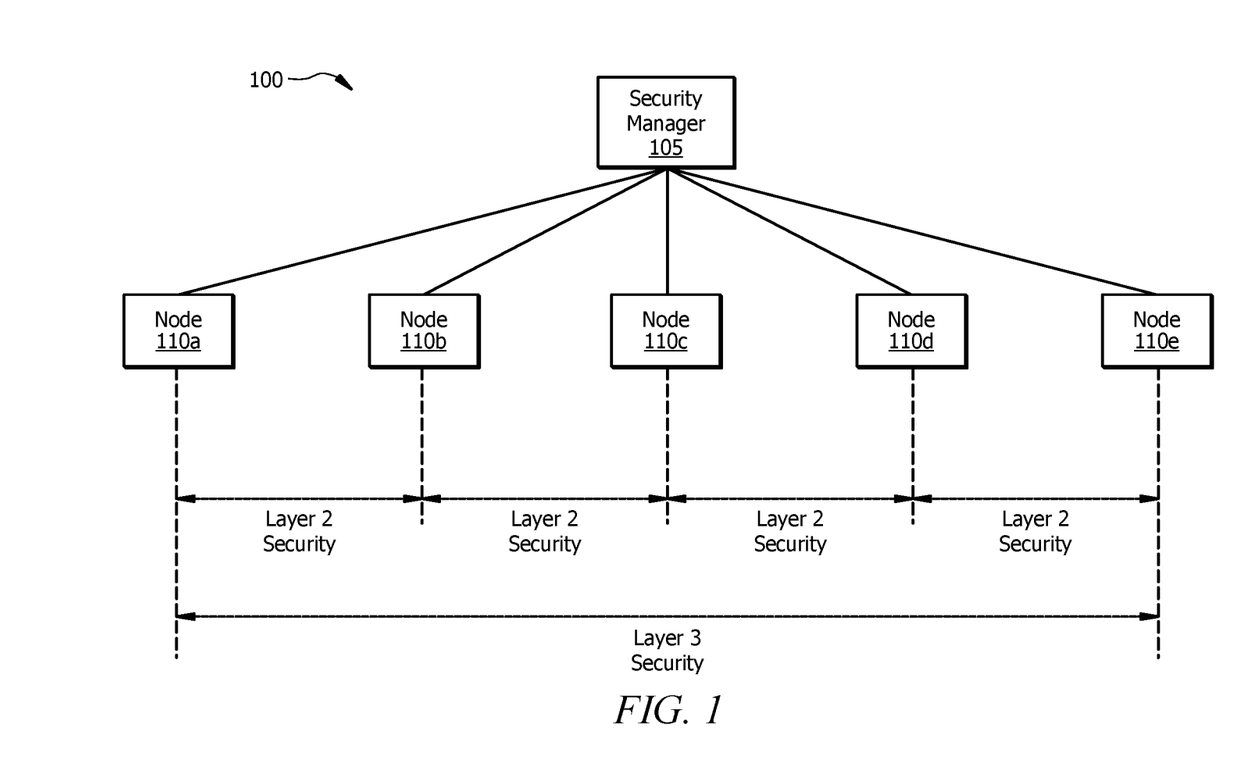
FIG. 1 illustrates an example of a system, in accordance with certain embodiments.

FIG. 1 illustrates an example of a system 100, in accordance with certain embodiments. System 100 comprises a security manager 105 and a plurality of nodes 110. In general, security manager 105 may be configured to receive and manage information for security validation (e.g., information indicating proof of security and/or proof of security level). Security manager 105 may receive the information from one or more nodes 110. In an embodiment, security manager 105 may receive the information from an egress node associated with a packet. For example, the packet may collect the information indicating proof of security and/or proof of security level as the packet traverses a path from an ingress node 110 to the egress node 110, and the egress node 110 may provide the information to security manager 105. Security manager 105 may use the information to monitor compliance with security policies, to collect statistics, to facilitate trouble-shooting, and/or for other suitable purposes. Functionality of security manager 105 may be integrated in one computer system or distributed among multiple computer systems (which may communicate via a network). In certain embodiments, security manager 105 may be implemented in a server, a host, a central controller, or other computer system, and security manager 105 may communicate with one or more node(s) 110 via a network. In other embodiments, security manager 105 may be included in a node 110. For example, one or more nodes 110 may each include at least a portion of the same security manager 105, or different nodes 110 may each include a different security manager 105.

In general, anode 110 may be configured to transmit and/or receive data. Examples of nodes 110 may include routers, switches, gateways, firewalls, hosts, servers, endpoint devices, and/or other types of nodes. In the example illustrated in FIG. 1, the plurality of nodes comprise a first node 110a, a second node 110b, a third node 110c, a fourth node 110d, and a fifth node 110e. Nodes 110a-e form a path for data. Data may be communicated via packets. In the path shown in FIG. 1, the first node 110a is configured at one end of the path and the fifth node 110e is configured at the other end of the path. Certain data may be communicated from the first node 110a as the ingress node (e.g., source node, iOAM encap node) to the fifth node 110e as the egress node (e.g., destination node, iOAM decap node). Other data may be communicated from the fifth node 110e as the ingress node to the first node 110a as the egress node. Certain embodiments secure the end-to-end path using Layer 3 security, such as IPsec. In the example illustrated in FIG. 1, the path comprises four hops: a first hop from the first node 110a to the second node 110b, a second hop from the second node 110b to the third node 110c, a third hop from the third node 110c to the fourth node 110d, and a fourth hop from the fourth node 110d to the fifth node 110e. Certain embodiments secure each hop using Layer 2 security, such as MACsec.

The path shown in FIG. 1 is for purposes of example and explanation. Other paths may include more or fewer nodes 110. Similarly, system 100 may include more or fewer nodes 110, and different combinations of nodes 110 may be used to form different paths.

Certain embodiments measure a security flow with validations for the "proof of security" and its "proof of security level" from an end-to-end path perspective. Certain embodiments include the "proof of security" and "proof of security level" validation checks in the framework set forth in iOAM. iOAM records operational information in the packet while the packet traverses a path between two points in the network. iOAM complements out-of-band or "active" OAM mechanisms based on Internet Control Message Protocol (ICMP) or other types of probe packets.

Certain embodiments provide per-hop validation checks and statistics collection for validating the "proof of security" and/or "proof of security level" of the end-to-end path and all encryption interfaces the path traverses. Certain embodiments provide the "proof of security" on an end-to-end path to prove that the flow is truly encrypted and provide the "proof of security level" on the end-to-end path to check the security levels and strength on the methods for which it is encrypted.

Certain embodiments provide the "security validation" security checks on an end-to-end path, for proof the flow is truly encrypted, and execute a check of the security levels and strength on the methods for which the data flow is encrypted, either end-to-end (over-the-top with IPSec) or per-hop with MACsec encryption. In certain embodiments, security validation comprises proof of security, proof of security level, or both.

Proof of Security (POS): if a packet is supposed to be encrypted (e.g., based on a policy configured by a network operator), POS checks for proof to verify that the packet was actually encrypted. Certain embodiments check the packet's security headers throughout the path traversed by the packet. Examples of security headers may include one or more IPsec headers (e.g., Encapsulated Security Payload (ESP) and/or Authentication Header (AH) can be checked) and/or MACsec headers (e.g., Ether-Type can be checked). All nodes 110 traversed by the packet can contribute this information (e.g., each node 110 in the path can add its proof of security information to the packet). In embodiments that use an iOAM framework, each node 110 of the path that is in the iOAM domain can contribute this information into iOAM security attributes.

Proof of Security level (POSL): if a packet is supposed to have a certain security level (e.g., based on a policy configured by a network operator), POSL checks for proof to verify that the packet satisfies the security level. Examples of security level information that may be checked in POSL validation include encryption algorithm, key length, integrity algorithm, rekey count, rekey time (e.g., based on lifetime seconds and/or lifetime kilobytes, KB), anti-replay check on/off, Perfect Forward Secrecy (PFS), Diffie-Hellman algorithm (DH-Algo) used in deriving session keys (enc, iv), authentication method used between end-host, etc. Certain embodiments derive security level information from the Security Association (SA) associated with the flow. In certain embodiments, intermediate nodes 110 do not possess security level information, so only the end nodes 110 (e.g., end hosts) contribute the security level information into iOAM security attributes.

Certain embodiments also add control plane security protocol level information, similar to how both endpoints authenticated each other (e.g., pre-shared key or X.509-certificate or extensible authentication protocol (EAP)-XXX), identify the security level of the control plane protocols (e.g., DH-Algo, Encryption algorithm, Integrity algorithm), and on which current SA it is derived (e.g., Internet key exchange version two (IKEv2) for IPsec or MACsec Key Agreement (MKA) for MACsec).

As indicated above, certain embodiments of the POSL validation may check information related to the rekey concept. The rekey concept is to derive new session keys (enc, iv) for the same data flow. Rekey count demonstrates how many new keys have been derived for that point in time. Rekey is generally triggered based upon timer or Kilobyte (KB) encrypted using the same key. Timer value or KB value associated with SA can provide the operator with information indicating whether the values (and, thus, the associated keys) are properly configured as per the operator's intended policy.

As indicated above, certain embodiments of the POSL validation may check information related to the Perfect Forward Secrecy (PFS) concept. PFS is used where separate/new DH secrets are used each time to derive new session keys. Hence, if one key gets compromised, it does not give information about previously derived sessions keys for the session.

As indicated above, certain embodiments may be implemented within the framework of the iOAM specification. Certain embodiments modify the iOAM speciation to facilitate security validation. As an example, certain embodiments add support for the Proof of Security capability to the Internet Engineering Task Force (IETF) Requirements for In-situ OAM (draft-brockners-inband-oam-requirements-03), dated Mar. 13, 2017, and/or other portion of the iOAM specification. Certain embodiments leverage a "type of information" field specifically for the iOAM security specific attributes. Examples of types include: edge-to-edge, selected hop, and per-hop type, where security Proof of Security information (such as stats collection) will be gathered, and all of those types can be leveraged.

Additionally, Proof of Security Level may be gathered and correlated as an iOAM packet traverses the network, then cross-checked for verification. New type length value (TLV) Trace-Type Options may be added. For example, new TLV Trace-Type Options may be added to the IETF's Data Fields for In-situ OAM (draft-ietf-ippm-ioam-data-11), dated Nov. 22, 2020, and/or other portion of the iOAM specification. Examples of new iOAM Option-types include:

security+single-hop, security+edge-to-edge;

POS Attribute(s): security type, such as IPSec+attribute interest [ESP/AH], MACsec+attribute check interest [ether-type], SSL, and/or other security type;

POSL Attribute(s): per the POS+TLV/sub-TLV for POSL (key length, ciphers, cipher strength, and algorithms)

The following provides examples of overall steps that may be used for security validation. Certain embodiments configure one or more flows that require being measured for iOAM security attributes across the iOAM domain.

1. Packet enters at iOAM Encap node 110. It could be the same node 110 where Security encap/encrypt starts. This node 110 would add POS attributes and POSL attributes. Later, the packet gets encrypted and sent out into the network with iOAM.

2. The encrypted packet arrives at one or more intermediate node(s) 110. Each intermediate node 110 will add POS attributes into iOAM.

3. The encrypted packet enters the iOAM Decap node 110. This node 110 will add POS attributes and POSL attributes. Now, complete iOAM decap happens and all security attributes (POS and POSL attributes) added by all nodes 110 so far get assembled and sent to security manager 105 (such a central security controller) for verification. The encrypted packet gets decrypted and takes its own journey.

4. Security manager 105 verifies all security information against configured policy and determines whether or not the network is in compliance with the expected security levels. For example, security manager 105 checks, for the respective flow, whether all nodes 110 have added POS attributes (if yes, it means that the flow always had security headers, which in turn means that the flow remained encrypted and that is the Proof of Security). Similarly, by checking POSL attributes, security manager 105 can check if the flow was encrypted using an expected level of security and that is the Proof of Security Level.

The following provides an example of security validation for IPSec policy (assumed IPSec Transport mode). For purposes of the example, the topology comprises three nodes 110, which may be referred to as Node1----Node2----Node3. POS attributes may comprise [SPI, ESP/AH], where SPI refers to a Security Parameter Index that enables the receiving system to select the Security Association (SA) under which a received packet will be processed. POSL attributes may comprise [SPI, ESP/AH, ENC-ALG, KEY-SIZE, and/or other POSL attributes].

1. (IP+Payload)
2. Node1: iOAM Encap node:iOAM (Node1, POS, POSL)+ESP Header(SPI)+(IP+Payload)+ESP Trailer
3. Node2: iOAM intermediate node:iOAM (Node2, POS)+iOAM (Node1, POS, POSL)+ESP Header(SPI)+(IP+Payload)+ESP Trailer
4. Node3: iOAM Decap node: iOAM (Node3, POS, POSL)+iOAM (Node2, POS)+iOAM (Node1, POS, POSL)+ESP Header+(IP+Payload)+ESP Trailer
5. Security manager 105 checks whether all nodes 110 have recorded iOAM security attributes and cross-verifies the attributes against a configured network policy. As an example, security manager 105 checks that all nodes 110 have recorded ESP/AH in POS attributes. Also, security manager 110 can use SPI (Security Parameter Index) contained in ESP/AH to make sure that it remained the same for all nodes 110. This confirms Proof of Security. As another example, security manager 105 checks POSL attributes to verify the encryption algorithm, key-length, Packet authentication algorithm, and/or other POSL attributes. This is Proof of Security Level. Security manager 105 can cross-verify POSL attributes details from Node1 & Node3 to confirm whether or not they match. In certain embodiments, security manager 105 declares whether network security complies with a configured policy based on the results of the POS check and the POSL check. Security manager 105 may store the compliance or non-compliance result in a log, communicate the result to a network operator, use the result to determine a security health score for the network, and/or take other suitable action.

Certain implementations may encounter some challenges, such as when original traffic is tunneled inside another IP header (such as in IPsec Tunnel mode) with total encryption. In such implementations, intermediate nodes 110 cannot see inside the packet and its IP address and cannot match with the iOAM policy. Certain embodiments solve this in the following ways: 1. intermediate nodes 110 can have Outer IP traffic policy configured for iOAM; or 2. intermediate nodes 110 find that if there is already iOAM presence in packet and they too are configured with iOAM enabled, then they will contribute for iOAM data.

In certain embodiments, a given node 110 may act as an encrypting/decrypting node, a passthrough for encryption performed by a previous node 110, or both. As an example, second node 110*b* may act as an intermediate/passthrough node with respect to end-to-end encryption (e.g., Layer 3 encryption) between first node 110*a* and fifth node 110*e*. Second node 110*b* may act as an encrypting node with respect to the hop from second node 110*b* to third node 110*c* (e.g., second node 110*b* may perform Layer 2 encryption for the hop).

In summary, certain embodiments allow for validating that an interface/link is truly encrypted and encrypted at the levels intended (cipher strength, key strength). Certain embodiments allow for the inclusion of security packets counters as well. Examples like drop count (for reasons like Integrity not matched), incorrect Security index, anti-replay counters (many reasons this adds value beyond just security flags, such as network drops downstream, high latency links, mis-configured QoS), to name several. Certain embodiments add "proof of security" and/or "proof of security level" validation in order to ensure end-to-end encryption is truly applied to an interface, and the level of encryption intended to be applied is truly applied. Certain embodiments introduce methods for in-depth proof of security checking on end-to-end secure flows, via enhancing iOAM, allowing iOAM to collect the security data per-hop and end-to-end, cross-checking this data against an expected compliance policy to decide (and assure) whether or not it meets the network's security standard levels.

It is not uncommon that networks and hosts are operated by different groups. Still, it is often the case that the network group is asked to provide insights on whether proper security measures are in place. Certain embodiments of the present disclosure allow the network operator to have, depending on the deployment, network nodes and hosts/network interface cards (NICs) include information in the packets about if security methods were or should have been applied to the packet.

This information is to help the network operator compare the desired setup with the current (i.e., running config) setup in order to help identify misconfigurations, wrong implementations, weak security ciphers, inadequate security policy/compliance (such as compliance with Federal Information Processing Standard—FIPS), etc. In "FIPS on" mode, for example, a router must not be allowed or enabled to make use of weak ciphers (such as Data Encryption Standard (DES) ciphers, Message Digest 5 (MD5) ciphers, or Rivest Cipher 4 (RC4) ciphers) or small key lengths for various algorithms. The present disclosure targets these use cases, supporting automation for collecting the security snapshot from different nodes in the network and information collected in conjunction with other data (which may be collected separately in different way not covered in this disclosure) that would be useful for verifying overall security audit, compliance processes, and an aggregate end-to-end "security health score" for the network path.

Certain embodiments identify the traffic that is supposed to be encrypted by using an n-tuple (using Access Control List (ACL) matching) and/or an additional "Flow-ID." As an example, Flow-IDs have been proposed for iOAM in the IETF's Postcard-based In-band Flow Data Telemetry (draft-song-ippm-postcard-based-telemetry-02), dated Mar. 7, 2019. Embodiments of the present disclosure detect whether the packet is expected to be encrypted and if so, whether it was encrypted with the required security level. This observation of the security level is performed by a different entity (or code block) than the encryption itself.

If a situation occurs where a packet is not encrypted or a weak configuration exists (e.g., lower strength cipher, smaller key length, or weaker algorithm) then the iOAM security data would either contain null information (if the packet is not encrypted at all) or detailed indications about the security attributes of interest (such as cipher, key-size). The iOAM security information would be collected along the path (e.g., with other iOAM information). At the iOAM decap node, the security information would be passed on to a security manager 105 for further analysis. In the current example, the security manager 105 will execute on the "diff" of existing and "target" compliance configurations, and may recognize that certain traffic was missing encryption, although it was assumed by network operations that it should have been encrypted per the operator's policy.

Given that in some embodiments the entity that encrypts and the entity that observes could be the same device, the encryption and the observation function may be separated such that encryption and observation are handled by different subsystems, which in some cases may be assisted by different hardware accelerators.

In certain embodiments, once a packet is encrypted, intermediate nodes 110 cannot check the payload. The intermediate nodes 110 may simply report that the packet continues to be encrypted. Intermediate/transit nodes 110 can do so by checking for the presence of an encrypted protocol header (such as ESP/AH for IPSec), established security association, and record it in the iOAM data. As described above, flow identification may use n-tuple and/or Flow-ID.

As an example, if the network policy said that all traffic should be IPsec ESP protected, certain embodiments check whether a flow is missing encryption would check cipher, key-size, MAC and also control-plane protocol's info (IKEv2 for IPSec) like peer-Auth-method, DH-group, etc. In certain embodiments, such as for encryption solutions such as MACsec, more "per-hop" analysis can be done because of the nature of an encrypted flow, versus IPSec where the underlay is not aware of the encrypted traffic flow so can only occur at the destination security association peer.

For purpose of scaling to encompass paths that include many hops, certain embodiments limit the amount of information added per hop. For example, the path may transmit a packet comprising address information (e.g., IP address)

and a payload. Each node 110 in the path may add a few bytes (such as 4 to 8 bytes) to the packet, wherein the added bytes comprise POS information. Encap and decap nodes 110 may add more bytes to the packet, wherein the added bytes comprise POSL information (intermediate nodes 110 configured to passthrough encryption need not add POSL information). Examples of possible information sizes include Enc-Algorithm-Type: 1 byte, cipher-size: 2-bytes, Auth-Algo-Type:1 byte, Encrypt-Header-Presence: 1 byte, Encrypt-protocol-related-info: 4-bytes (such as SPI for IPSec). To further facilitate scaling, iOAM collection does not have to be "always on" or "for all packets." Rather, iOAM can be applied selectively (e.g., for a debugging situation) or on a periodic basis (e.g., for an audit situation). The information gathered would give more security insight and actionable output.

Certain embodiments may be used to detect bugs (e.g., hardware or software bugs in a router or other network device) or configuration issues. As an example, certain embodiments may be used to detect an ASIC dropping a specific traffic pattern. Certain embodiments include capability that targets information collection (e.g., security attributes relevant to the encryption configuration) for compliance verification. Certain embodiments enhance per-hop security compliance verification.

In an embodiment, suppose a packet enters a router, encrypted as expected, then is decrypted there, for example as it is being sent to a Switched Port Analyzer (SPAN) port, before being re-encrypted on the way out of another regular port. The iOAM attributes may be configured to report that packet has been decrypted. Whether to treat this as problem depends upon the use case for the encrypted flow and whether the decryption step is expected based on the applicable policy. Security manager 105 can collect and run this policy and can generate an alert if it is required. It should also be noted, in certain encryption solutions that are per-hop, such as MACsec, this per node behavior (send packet to a SPAN port) is an advantage of per-hop encryption solutions.

Certain embodiments may be used for compliance purposes to measure the validity of the security policy on packets and to offer the ability to collect the "on-box" configuration and compare it to the expected ("golden") configuration as packets transit the network. Ensuring that the on-box configuration matches the expected configuration, provides a meaningful step to securing the network. Certain embodiments offer the ability to frequently monitor the security attributes to assure configuration changes or errors were not misconfigured that weaken the security session (key strength, cipher strength, etc). Certain embodiments detect security changes that weaken the encryption session. As indicated above, each attribute can be collected per-hop where the attribute applies. Other systems, such as a segment routing controller, can leverage this collected content so a "security of the path" can be similar to "best path routing cost" for those network operators that put security over shortest path as the best path for certain traffic types.

Figure 2:
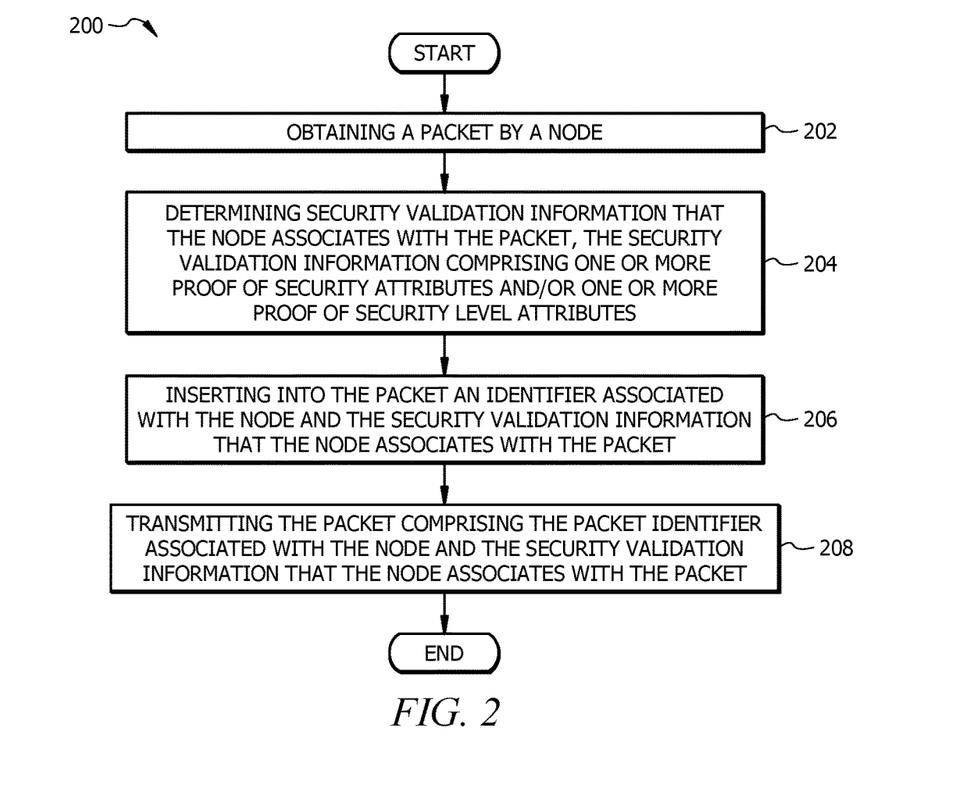
FIG. 2 illustrates an example flow chart of a method that may be performed by a node of the network, in accordance with certain embodiments.

FIG. 2 illustrates an example of a method 200 that may be performed by a node 110, in accordance with certain embodiments. Method 200 begins at step 202 with obtaining a packet. In certain embodiments, the packet may be received from a previous node 110. In other embodiments, the packet may be received from another source or generated by the current node 110.

Method 200 proceeds to step 204 with determining security validation information that the current node 110 associates with the packet. The security validation information comprises one or more proof of security (POS) attributes and/or one or more proof of security level (POSL) attributes. In certain embodiments, step 204 determines one or more POS attributes but does not determine POSL attributes. For example, this may occur in embodiments configured to simply check basic proof of security or in embodiments where the current node 110 does not have access to the one or more POSL attributes (such as if the current node 110 is an intermediate node that does not have access to certain end-to-end POSL attributes). In certain embodiments, step 204 determines one or more POSL attributes but does not determine POS attributes. For example, the one or more POSL attributes may implicitly indicate the presence of proof of security such that certain embodiments may opt not to determine POS attributes (e.g., to reduce packet size). In other embodiments, step 204 may determine both POS and POSL attributes.

Examples of POS attributes are described above with respect to FIG. 1. As an example, in certain embodiments, the one or more POS attributes may comprise a security type (such as IPsec or MACsec). In certain embodiments, the one or more POS attributes may comprise information associated with the security type (such as an ESP/AH attribute for IPsec or an Ether-Type attribute for MACsec). In certain embodiments, at least one of the one or more POS attributes may be determined based at least in part on a header present in the packet when the current node 110 processes (e.g., receives and/or transmits) the packet. Thus, although certain headers may change as the packet traverses the network (e.g., an encrypting/encap node may add a header or a decrypting/decap node may remove a header), information indicated by the header present when the packet traversed the current node 110 can be preserved in one or more of the POS attribute(s).

Examples of POSL attributes that the current node 110 associates with the packet are described above with respect to FIG. 1. In certain embodiments, the POSL attributes indicate one or more of the following attributes: an encryption algorithm; a cipher; a cipher strength; a key length; an integrity algorithm; a rekey count indicating a number of times that a new key has been derived; a rekey time; anti-replay configuration; Perfect Forward Secrecy (PFS) configuration; Diffie-Hellman algorithm used in deriving session keys (enc, iv); and/or an authentication method.

In certain embodiments, the security validation information that the current node 110 associates with the packet comprises security validation information associated with a Layer 2 connection for a hop in a path traversed by the packet (examples of which are shown as Layer 2 security in FIG. 1). As an example, if the current node 110 corresponds to any of nodes 110a, 110b, 110c, 110d, or 110e in FIG. 1, the current node 110 may include security validation information associated with the Layer 2 connection for the corresponding hop. In certain embodiments, the security validation information that the node associates with the packet comprises security validation information associated with a Layer 3 connection spanning multiple hops in a path traversed by the packet. As an example, if the current node 110 corresponds to node 110a or node 110e in FIG. 1, the current node 110 may include security validation information associated with the Layer 3 connection that spans from node 110a to node 110e.

The method proceeds to step 206 with inserting into the packet (1) an identifier associated with the current node 110, and (2) the security validation information that the current node 110 associates with the packet (the security validation information determined in step 204). The identifier associated with the current node 110 may comprise any suitable information to indicate which node 110 inserted the current security validation information. For example, the identifier may comprise one or more of: an address of node 110, a device ID of node 110, an interface ID associated with node 110, a port ID associated with node 110, etc. In certain embodiments, the identifier may be pre-configured (e.g., each node 110 may be assigned a unique identifier). In other embodiments, the identifier may be determined dynamically. As an example, the identifier may be an index indicating a hop in the packet's path that the current node 110 corresponds to. For example, in FIG. 1, node 110a may have an index value of 1, node 110b may have an index value of 2, and so on.

In certain embodiments, the information inserted in the packet in step 206 is inserted into an iOAM field within the packet. In embodiments where the current node 110 received the packet from a previous node 110, the packet received from the previous node 110 comprises a previous identifier associated with the previous node 110 and previous security validation information that the previous node 110 associates with the packet. Step 206 inserts the identifier associated with the current node 110 and the security validation information that the current node 110 associates with the packet before or after the previous identifier and the previous security validation information. As an example, with reference to FIG. 1, suppose node 110b is the current node. Node 110b may receive the packet from node 110a. The packet received from node 110a may include identifier 1 and its associated security validation information (e.g., POS-1 and/or POSL-1). Node 110b may retain identifier 1 and node 110a's associated security validation information (e.g., POS-1 and/or POSL-1) in the packet, and node 110b may add to the packet identifier 2 and node 110b's associated security validation information (e.g., POS-2 and/or POSL-2).

Method 200 proceeds to step 208 with transmitting the packet comprising the identifier associated with the current node 110 and the security validation information that the current node 110 associates with the packet (e.g., together with the previous identifier(s) and previous security validation information inserted by previous node(s) 110, if any). In certain embodiments, the packet is transmitted to a next node 110 (such as node 110c) configured to insert into the packet a next identifier associated with the next node 110 and next security validation information that the next node 110 associates with the packet. In addition, or in the alternative, certain embodiments transmit the packet to security manager 105. Optionally, the current node 110 may modify the packet depending on the destination. As an example, when sending the packet to a next node, the packet may comprise the security validation information (POS and/or POSL) and a payload of the packet. When sending the packet to security manager 105, the packet may comprise the security validation information (POS and/or POSL). The packet sent to security manager 105 may either include the payload or omit the payload, depending on the embodiment (e.g., the payload may be omitted to reduce network overhead or for data security reasons). As described with respect to FIG. 1, security manager 105 is configured to analyze the security validation information (POS and/or POSL) inserted by the node 110 from which the security manager receives the packet, together with additional security validation information inserted by other nodes 110 of a path traversed by the packet.

Security manager 105 may inspect the packet for any suitable purpose, such as for compliance or operations purposes. Certain embodiments, security manager 105 may generate a security report and communicate the security report to a network operator. The security report helps the network operator to understand the security configuration associated with the nodes 110 traversed by the packet. The network operator can use the security report to confirm that the nodes 110 apply proper security or to catch a configuration error (such as a layer 2 configuration error, a layer 3 configuration error, or a configuration error at any other layer that configures encryption). For example, if the security validation information included in the packet indicates that the configuration is as expected (e.g., based on a golden configuration or policy) at the first node 110a, but not as expected at the second node 110b, the network operator may troubleshoot the second node 110b. In certain embodiments, security manager 105 may provide statistics, such as a number of packets dropped for security-related reasons.

In certain embodiments, security manager 105 may analyze security validation information from different packets to determine if a problem is specific to a particular type of packet. As an example, suppose a first packet carries a first type of traffic and a second packet carries a second type of traffic. If the security validation information in the first packet indicates a configuration error at a particular node 110, interface, or hop and the security validation information in the second packet indicates a correct configuration at the particular node 110, interface, or hop, security manager 105 may generate a security report that recommends to the network operator to troubleshoot the first type of traffic.

Figure 3:
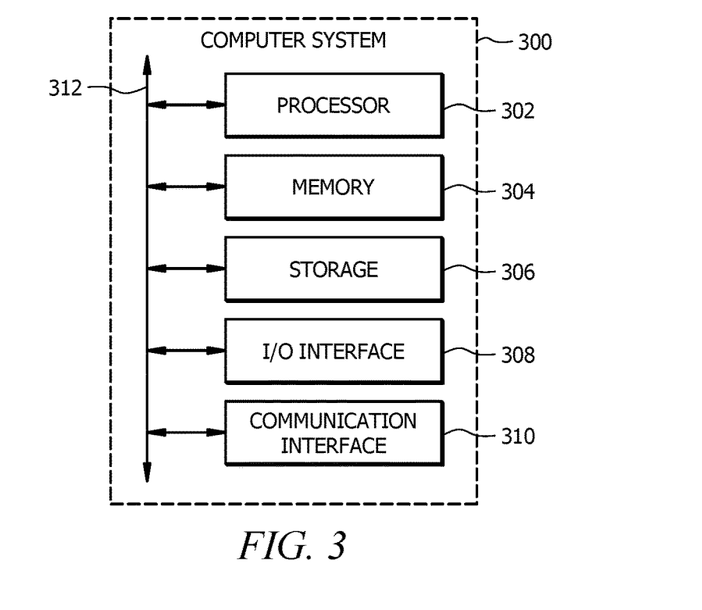
FIG. 3 illustrates an example of a computer system, in accordance with certain embodiments.

Reference is now made to FIG. 3, wherein is shown an example computer system 300 which may be used by the systems and methods described herein. In particular embodiments, one or more computer systems 300 provide functionality described or illustrated herein. As an example, one or more computer systems 300 may be used to provide at least a portion of a security manager 105 and/or a node 110 described with respect to FIG. 1. As another example, one or more computer systems 300 may be used to perform one or more steps described with respect to FIG. 2. In particular embodiments, software running on one or more computer systems 300 provides functionality described or illustrated herein or performs one or more steps of one or more methods described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface

308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A node, the node comprising:
   one or more processors; and
   one or more computer-readable non-transitory storage media comprising instructions that, when executed by the one or more processors, cause one or more components of the node to perform operations comprising:
      determining security validation information that the node associates with a packet, the security validation information comprising one or more proof of security attributes and/or one or more proof of security level attributes;
      inserting into the packet an identifier associated with the node and the security validation information that the node associates with the packet;
      transmitting the packet comprising the identifier associated with the node and the security validation information that the node associates with the packet.

2. The node of claim 1, the operations further comprising:
   prior to determining the security validation information, receiving the packet from a previous node, wherein the packet received from the previous node comprises a previous identifier associated with the previous node and previous security validation information that the previous node associates with the packet;
   wherein the identifier associated with the node and the security validation information that the node associates with the packet are inserted before or after the previous identifier and the previous security validation information.

3. The node of claim 1, wherein the security validation information comprises at least one proof of security attribute determined based on a header present in the packet when the node processes the packet, said at least one proof of security attribute indicating a security type or information associated with the security type.

4. The node of claim 1, wherein the security validation information comprises one or more of the following proof of security level attributes: an encryption algorithm, a cipher, a cipher strength, or a key length.

5. The node of claim 1, wherein the security validation information comprises one or more of the following proof of security level attributes: integrity algorithm, a rekey count indicating a number of times that a new key has been derived, a rekey time, anti-replay configuration, Perfect Forward Secrecy (PFS) configuration, Diffie-Hellman algorithm used in deriving session keys (enc, iv), or an authentication method.

6. The node of claim 1, wherein the security validation information that the node associates with the packet comprises security validation information associated with a Layer 2 connection for a hop in a path traversed by the packet.

7. The node of claim 1, wherein the security validation information that the node associates with the packet comprises security validation information associated with a Layer 3 connection spanning multiple hops in a path traversed by the packet.

8. The node of claim 1, wherein the security validation information that the node associates with the packet is inserted in an in-situ Operation and Maintenance (iOAM) field within the packet.

9. The node of claim 1, wherein the packet is transmitted to a next node configured to insert into the packet a next identifier associated with the next node and next security validation information that the next node associates with the packet.

10. The node of claim 1, wherein the packet is transmitted to a security manager configured to analyze the security validation information inserted by the node together with additional security validation information inserted by other nodes of a path traversed by the packet.

11. A method performed by a node, the method comprising:
    determining security validation information that the node associates with a packet, the security validation information comprising one or more proof of security attributes and/or one or more proof of security level attributes;
    inserting into the packet an identifier associated with the node and the security validation information that the node associates with the packet;
    transmitting the packet comprising the identifier associated with the node and the security validation information that the node associates with the packet.

12. The method of claim 11, further comprising:
    prior to determining the security validation information, receiving the packet from a previous node, wherein the packet received from the previous node comprises a previous identifier associated with the previous node and previous security validation information that the previous node associates with the packet;
    wherein the identifier associated with the node and the security validation information that the node associates with the packet are inserted before or after the previous identifier and the previous security validation information.

13. The method of claim 11, wherein the security validation information that the node associates with the packet is inserted in an in-situ Operation and Maintenance (iOAM) field within the packet and the security validation information comprises at least one proof of security attribute determined based on a header present in the packet when the node processes the packet, said at least one proof of security attribute indicating a security type or information associated with the security type.

14. The method of claim 11, wherein the security validation information that the node associates with the packet is inserted in an in-situ Operation and Maintenance (iOAM) field within the packet and the security validation information comprises one or more of the following proof of security level attributes: an encryption algorithm, a cipher, a cipher strength, or a key length.

15. The method of claim 11, wherein the security validation information that the node associates with the packet comprises one or more of the following:
   security validation information associated with a Layer 2 connection for a hop in a path traversed by the packet; and/or
   security validation information associated with a Layer 3 connection spanning multiple hops in the path traversed by the packet.

16. One or more computer-readable non-transitory storage media embodying instructions that, when executed by a processor of a node, cause the performance of operations comprising:
   determining security validation information that the node associates with a packet, the security validation information comprising one or more proof of security attributes and/or one or more proof of security level attributes;
   inserting into the packet an identifier associated with the node and the security validation information that the node associates with the packet;
   transmitting the packet comprising the identifier associated with the node and the security validation information that the node associates with the packet.

17. The one or more computer-readable non-transitory storage media of claim 16, the operations further comprising:
   prior to determining the security validation information, receiving the packet from a previous node, wherein the packet received from the previous node comprises a previous identifier associated with the previous node and previous security validation information that the previous node associates with the packet;
   wherein the identifier associated with the node and the security validation information that the node associates with the packet are inserted before or after the previous identifier and the previous security validation information.

18. The one or more computer-readable non-transitory storage media of claim 16, wherein the security validation information that the node associates with the packet is inserted in an in-situ Operation and Maintenance (iOAM) field within the packet and the security validation information comprises at least one proof of security attribute determined based on a header present in the packet when the node processes the packet, said at least one proof of security attribute indicating a security type or information associated with the security type.

19. The one or more computer-readable non-transitory storage media of claim 16, wherein the security validation information that the node associates with the packet is inserted in an in-situ Operation and Maintenance (iOAM) field within the packet and the security validation information comprises one or more of the following proof of security level attributes: an encryption algorithm, a cipher, a cipher strength, or a key length.

20. The one or more computer-readable non-transitory storage media of claim 16, wherein the security validation information that the node associates with the packet comprises one or more of the following:
   security validation information associated with a Layer 2 connection for a hop in a path traversed by the packet; and/or
   security validation information associated with a Layer 3 connection spanning multiple hops in the path traversed by the packet.

* * * * *